(12) United States Patent
Tsai

(10) Patent No.: US 6,511,083 B1
(45) Date of Patent: Jan. 28, 2003

(54) STEERING DEVICE FOR A SKATEBOARD

(76) Inventor: Tai-Yuan Tsai, No. 6, Alley 21, Lane 306, Sec. 2, Tai Lin Rd., Taishan Hsiang, Taipei Hsien (TW)

( * ) Notice: Subject to any disclaimer, the term of this patent is extended or adjusted under 35 U.S.C. 154(b) by 0 days.

(21) Appl. No.: 09/902,298

(22) Filed: Jul. 10, 2001

(51) Int. Cl.$^7$ .............................................. B62M 1/00
(52) U.S. Cl. ........................... 280/87.041; 280/87.021; 280/87.042
(58) Field of Search .................. 280/87.01, 87.041, 280/87.042, 87.021, 47.17, 11.19, 11.27, 14.27, 14.28; 403/131, 141, 142, 143

(56) References Cited

U.S. PATENT DOCUMENTS

| | | | | |
|---|---|---|---|---|
| 1,227,888 A | * | 5/1917 | Converse | 280/87.041 |
| 1,416,864 A | * | 5/1922 | Parkes | 280/7.1 |
| 1,568,412 A | * | 1/1926 | Parkes | 280/87.041 |
| 1,968,975 A | * | 8/1934 | Upsacker et al. | 280/14.28 |
| 2,150,814 A | * | 3/1939 | Barbato | 280/11.27 |
| 2,711,326 A | * | 6/1955 | Sorensen | 280/14.28 |
| 5,165,711 A | * | 11/1992 | Tsai | 280/87.041 |
| 5,899,167 A | * | 5/1999 | Furman | 116/173 |
| 5,947,493 A | * | 9/1999 | Pasin et al. | 280/47.34 |
| 6,199,880 B1 | * | 3/2001 | Favorito et al. | 280/14.28 |
| 6,206,388 B1 | * | 3/2001 | Ouboter | 280/87.042 |
| 6,244,605 B1 | * | 6/2001 | Liu | 280/655.1 |
| 6,305,698 B1 | * | 10/2001 | Liang | 280/655.1 |
| 6,318,741 B1 | * | 11/2001 | Chen | 16/900 |

\* cited by examiner

Primary Examiner—Brian L. Johnson
Assistant Examiner—Kelly E Campbell
(74) Attorney, Agent, or Firm—Thorp Reed & Armstrong, LLP

(57) ABSTRACT

A steering device for a skateboard has a front seat mounted with a pair of front rollers. The front seat has an upwardly extending cylinder. A receiving hole is defined in a top surface of the cylinder. The receiving hole receives a sphere inside. The sphere is connected to a shaft. The steering device enables the skateboard to be turned agilely, and is able to be adjusted to suit riders of different sizes.

3 Claims, 7 Drawing Sheets

STEERING DEVICE FOR A SKATEBOARD

BACKGROUND OF THE INVENTION

1. Field of the Invention

The present invention relates to a steering device for a skateboard, and more particularly to a steering device mounted on the skateboard that allows a rider to agilely steer the skateboard. The steering device can be adjusted to suit riders of different sizes and also to suit adults as well as children.

2. Description of Related Art

Skateboard riding has become a popular leisure activity nowadays. In parks or on campuses, a lot of people participate in skateboard riding not only for exercise but also for the amusement the skateboard brings. The skateboard has recently become an extreme sport vehicle and the fascinating stunts that are performed in the extreme sport encourage more people to participate in the skateboard riding.

For beginners, skateboard riding is not easy to learn as it requires good balancing of the body, especially when making a turn of the skateboard. The rider has to lean aside to press front wheels of the skateboard to turn correspondingly. During this process, the most important thing for the skateboard rider is to smartly control the balance of his body otherwise, the rider will be tipped over by the centrifugal force generated in the turn of the skateboard. To control and maintain balance in the turn of the skateboard. To control and maintain balance in the turn of the skateboard should not be a problem for an experienced or professional rider, but for beginners learning how to balance when riding the skateboard may not be an easy or pleasant thing. During the learning stage, a rider will almost certainly fall when changing direction of the skateboard and it is common for injuries to happen. Therefore, a lot of people give up before they can ride in an accomplished manner and so miss out on this wonderful activity.

Accordingly, the present invention tends to provide a steering device for a skateboard to mitigate or obviate the aforementioned problems.

SUMMARY OF THE INVENTION

An objective of the present invention is to provide a steering device for a skateboard that enables the skateboard to be turned agilely.

Another objective of the present invention is to provide a steering device for a skateboard such that the steering device has an adjustable steering shaft. The adjustable steering shaft can be adjusted to suit riders of different sizes.

Another objective of the present invention is to provide a steering device for a skateboard such that the steering device can be adjusted to suit adults as well as children.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
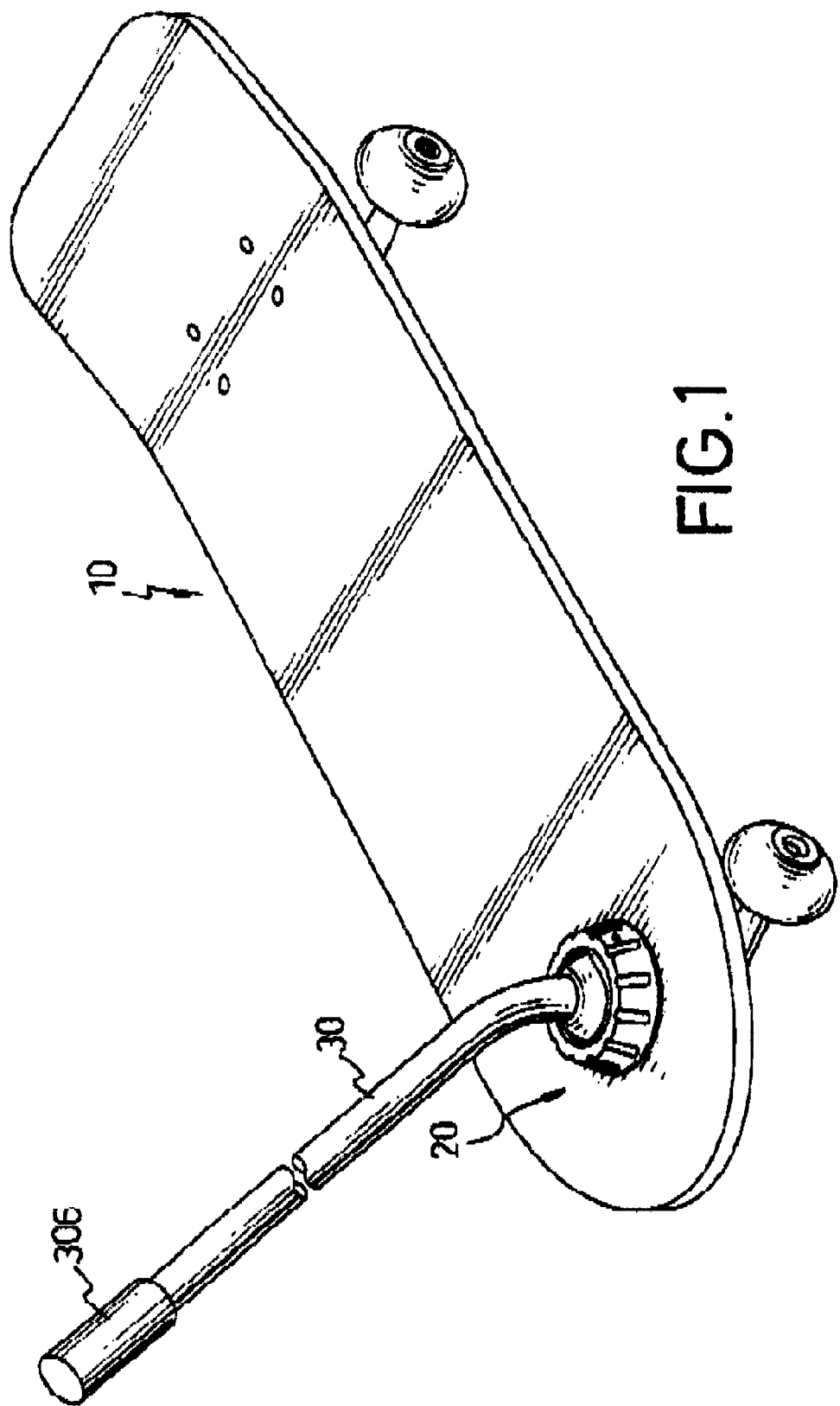
FIG. 1 is a perspective view of a preferred embodiment of a steering device for a skateboard.
Figure 2:
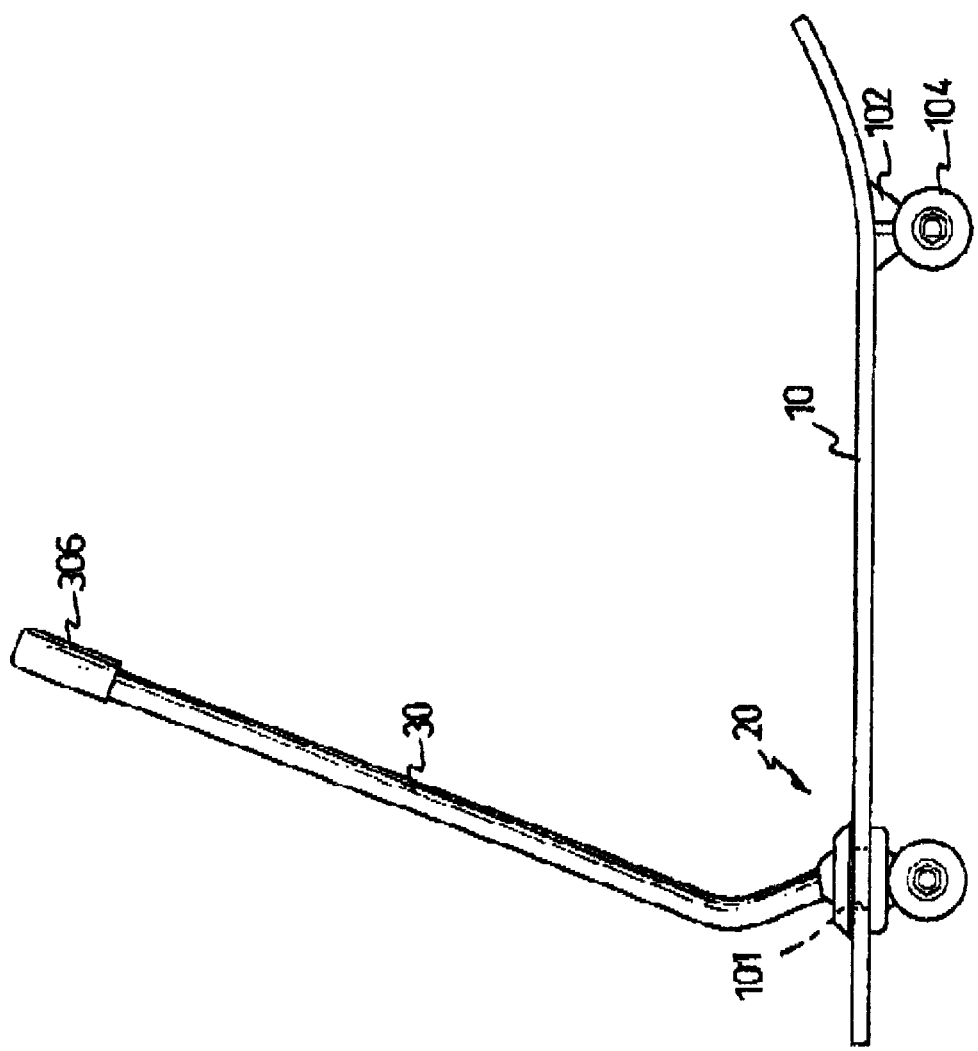
FIG. 2 is a side view of the preferred embodiment.

With reference to FIGS. 1 and 2, a steering device for a skateboard in accordance with the present invention has a board (10), a steering device (20) mounted on a front portion of the skateboard (10), and a steering shaft (30) coupled to the steering device (20).

The board (10) has a conventional shape except a front portion of the board (10) which is defined with a through hole (101). A rear portion of the board (10) is mounted with a rear seat (102) on an under side of the board (10), and the rear scat (102) is connected with a conventional pair of rear rollers (104). The rear rollers (104) are connected to the rear seat (102) using a rear axle (not shown) such that the rear rollers (102) can rotate freely with respect to the rear seat (104).

Figure 3:
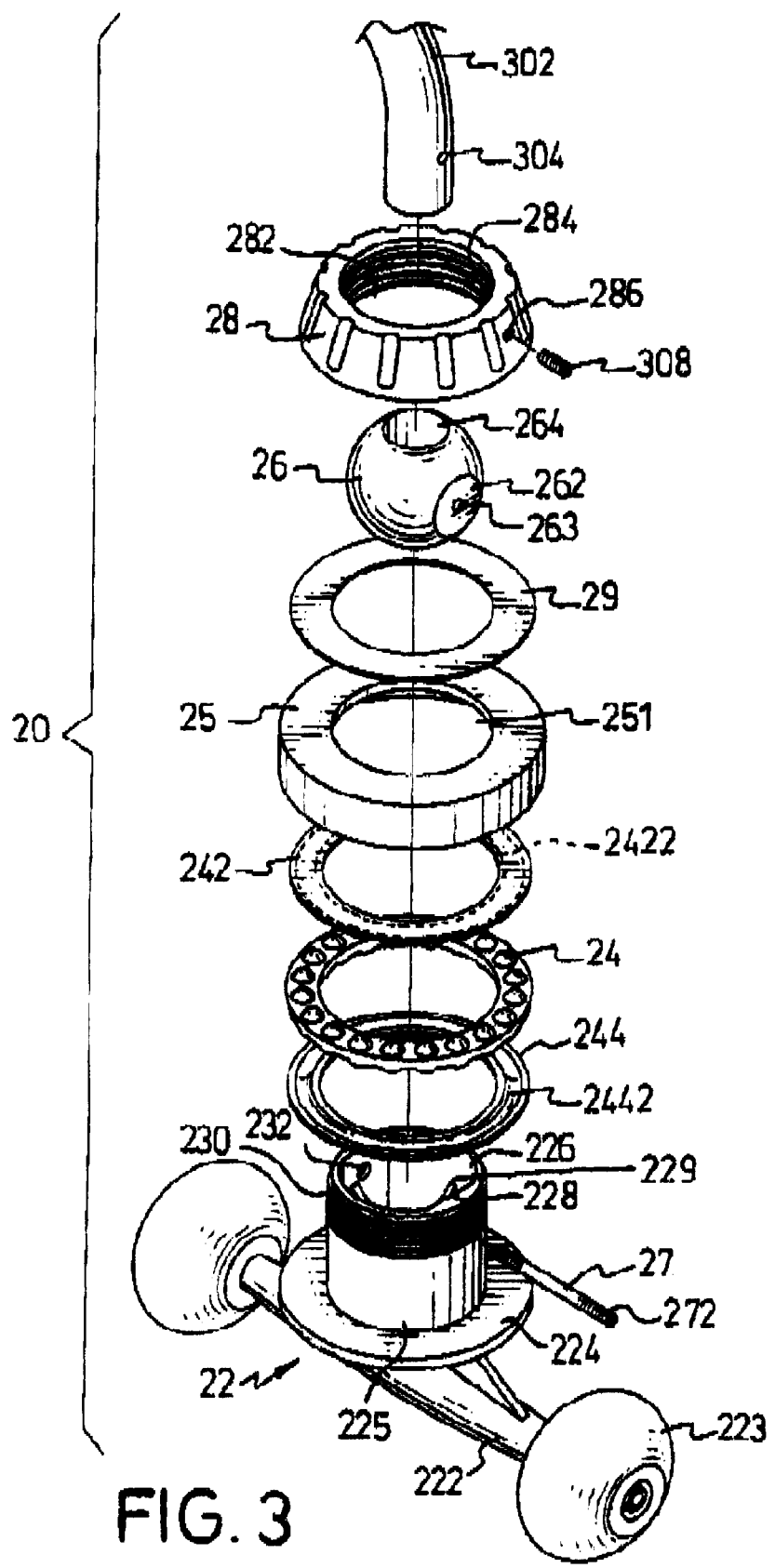
FIG. 3 is an exploded, perspective view of the steering device.

With reference to FIG. 3, the steering device (20) includes a front seat (22). The front seat (22) has a sleeve (222) extending from a bottom portion of the steering device (20) and in a direction perpendicular to the longitudinal axis of the steering device (20). A front axle (not shown) extends along and through the sleeve (222) and two ends of the front axle extend outside the sleeve (222). A pair of front rollers (223) is respectively connected to the two ends of the front axle such that the front rollers can rotate freely with respect to the front seat (22). A hollow cylinder (225) upwardly extends from the sleeve (222) and a flange (224) horizontally extends from a bottom portion of the cylinder (225). The cylinder (225) has a receiving hole (226) defined in a top surface of the cylinder (225) and the receiving hole (226) extends substantially into the cylinder (225). Two first abutting walls (228) defining the receiving hole (226) are parallely and oppositely formed to each other. At least one retaining piece (229) (better seen in FIGS. 4 and 5) is formed in a bottom surface defining the receiving hole (226). The cylinder (225) has a threaded portion (230) formed on an outer periphery of the cylinder (225). A threaded hole (232) is defined in the threaded portion (230) and extends through the cylinder (225) from one of the first abutting walls (228) to the other.

A bearing (24) having a ring shape is mounted around the cylinder (225). An upper washer (242) and a bottom washer (244) are also mounted around the cylinder (225) and sandwich the bearing (24) therebetween while the bottom washer (244) rests on the flange (224) of the cylinder (225). The upper washer (242) and the bottom washer (244) each have a surface that engages with the bearing (24). Each washer surface has an annular groove (2422, 2442) defined therein to receive balls of bearing (24). A cap (25) has an opening (251) centrally defined therein and mounts around the cylinder (225) to cover the upper washer (242), the bearing (24), and the bottom washer (244) on the flange (224) of the cylinder (225).

A sphere (26) configured to be received in the receiving hole (226) has two second abutting walls (262) parallely and oppositely formed in an outer surface of the sphere (26) to correspond to the first abutting walls (228) of the cylinder (225). An aperture (263) is defined in an extends through the second abutting walls (262). The sphere (26) further has a shaft hole (264) extending substantially upright through the sphere (26) in a direction parallel to the second abutting walls (262).

A stud (27) has two threaded ends (272) to mate with the threaded hole (232) of the cylinder (225). A length of the stud (27) is slightly shorter than a diameter of the cylinder (225), so that when the stud (27) is disposed in the cylinder (225) and has the two threaded ends (272) respectively received in the threaded hole (232), the threaded ends (272) will not protrude outside the threaded portion (230) of the cylinder (225).

A retaining ring (28) has a through bore (282) centrally defined therein to mount around the cylinder (225). An inner periphery defining the through bore (282) is formed with thread (284) to mate with the threaded portion (230) of the cylinder (225). A screw hole (286) extends through a side wall of the retaining ring (28) to receive a screw (308) having a flat end. A bottom surface of the retaining ring (28) engages a washer (29) that also mounts around the cylinder (225) to avoid rubbing of the bottom surface against a rough surface.

The steering shaft (30) has a bent end portion that forms a connecting end (302), and an opposed end portion mounted with a handle (306) (shown in FIGS. 1 and 2) for a rider to hold. An orifice (304) extends through the connecting end (302) of the steering shaft (30) to allow the stud (27) to extend therethrough.

Figure 4:
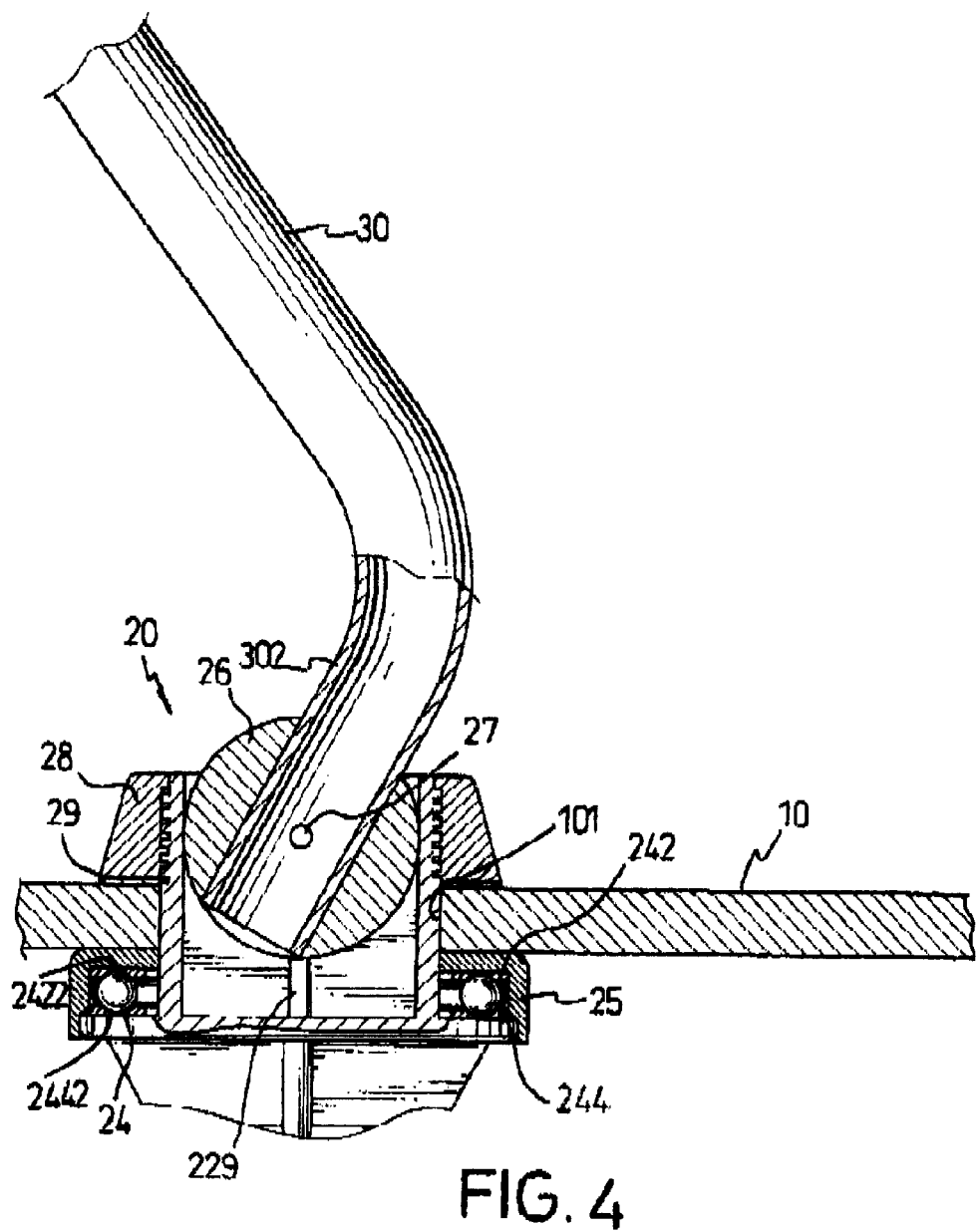
FIG. 4 is a partially cross-sectional, side view of the steering device in accordance with the present invention.
Figure 5:
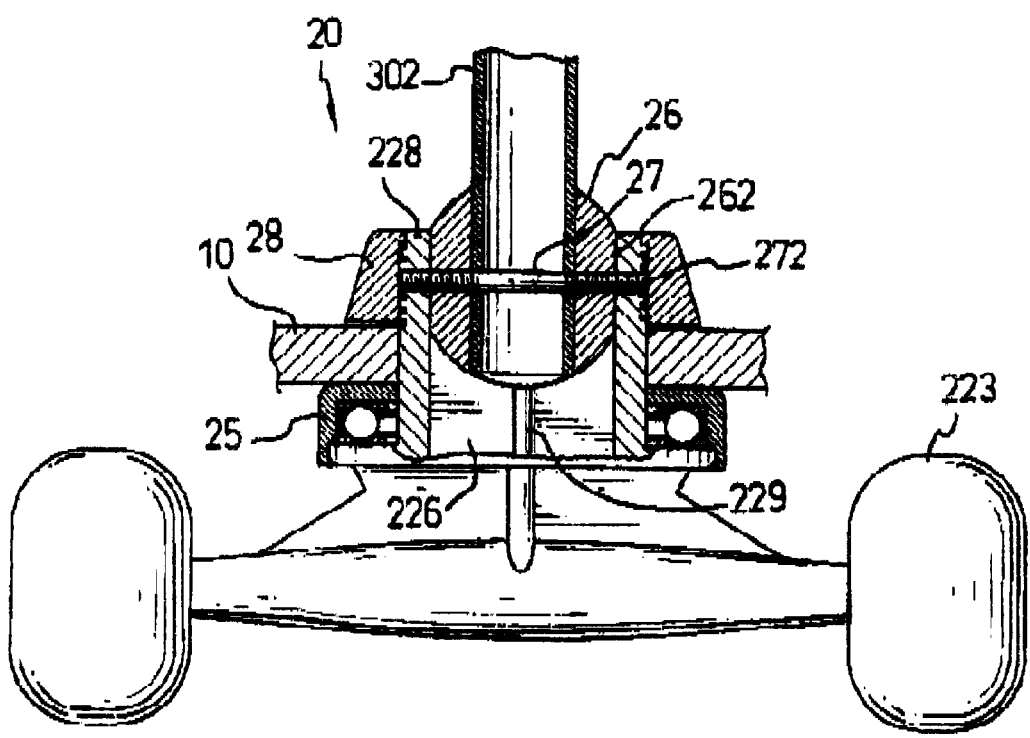
FIG. 5 is a partially cross-sectional, front view of the steering device.

With reference to FIGS. 3–5, in assembly, the upper washer (242), the bearing (24), and the bottom washer (244) are mounted around the cylinder (225) of the front seat (22). The upper washer (242) and the bottom washer (244) sandwich the bearing (24) therebetween while the bottom washer (244) rests on the flange (224) of the cylinder (225), and the balls of the bearing (24) are slidingly received and restricted in the annular grooves (2422, 2442) of the upper washer (242) and the bottom washer (244). The cylinder (225) further extends through the opening (251) of the cap (25) to mount the cap around the cylinder (25), and the cap (25) covers the upper washer (242), the bearing (24), and the bottom washer (244) on the flange (224). The cylinder (225) then extends through the through hole (101) of the board (10) and a top surface of the cap (25) engages the bottom surface of the board (10) that surrounds the through hole (101).

To assemble the front seat (22), the sphere (26), and the steering shaft (30) together, the connecting end (302) of the steering shaft (30) extends in the shaft hole (264) of the sphere (26, wherein the orifice (304) of the connecting end (302) communicates with the aperture (263) of the sphere (26). Then the sphere (26) is disposed in the receiving hole (226) and rested on the retaining piece (229) in the receiving hole (226) while the second abutting surface (262) of the sphere (26) engages with the first abutting surface (228) of the cylinder (225). The sphere (26) is adjusted such that the aperture (263) communicates with the threaded hole (232) of the cylinder (225). The cylinder (225), the sphere (26), and the steering shaft (30) are securely connected together by extending the stud (27) through the aperture (263), and the orifice (304) while the threaded ends (272) of the stud (27) are threadingly received in the threaded hole (232).

To assemble the front seat (22) and the board (10), the portion of the cylinder (225) that extends through the through hole (101) is mounted around with the washer (29) and the washer (29) rests on the top surface of the board (10). The retaining (28) then threadingly mounts around the cylinder (225) by mating of the thread (284) of the through bore (282) defined in the retaining ring (28) and the threaded portion (230) of the cylinder (225). At the same time, the washer (29) is being sandwiched between the top surface of the board (10) and the bottom surface of the retaining ring (28) to reduce rubbing. The screw (308) then extends through the screw hole (286) defined in the retaining ring (28) and the flat end of the screw (308) abuts to the threaded portion (230) of the cylinder (225) to secure the retaining ring (28) and the cylinder (235).

From the structure disclosed in the foregoing description, it is noted that the steering shaft (30) is securely connected with sphere (26) by the stud (27) that extends through the connecting end (302) of the steering shaft (30) and the sphere (26). It is also noted that the first abutting wall (228) of the cylinder (225) abuts to the second abutting wall (262) of the sphere (26). Therefore, the sphere (26) is only allowed to rotate in a 2-dimensional way such that the stud (27) is formed as a rotation axis of the sphere (26). Accordingly, when the steering shaft is turned left or right, that is, along the horizontal plane, due to the abutting of the second abutting surface (262) to the first abutting surface (228(, the cylinder (225) together with the front seat (22) and the front rollers (223) will be driven and turn to the corresponding side. This turning of the front rollers (223) will consequently result in change of the traveling direction of the skateboard. When the steering shaft (30) is turned along the vertical plane, that is the stud (27) forms the rotation axis, the steering shaft can be turned freely in a substantial range. Therefore, an angle formed by the steering shaft (30) and the board (10) can vary in the substantial range thus the relative height between the handle (306) of the steering shaft (30) and the board (10) can vary accordingly to suit rider of different sizes.

Figure 6:
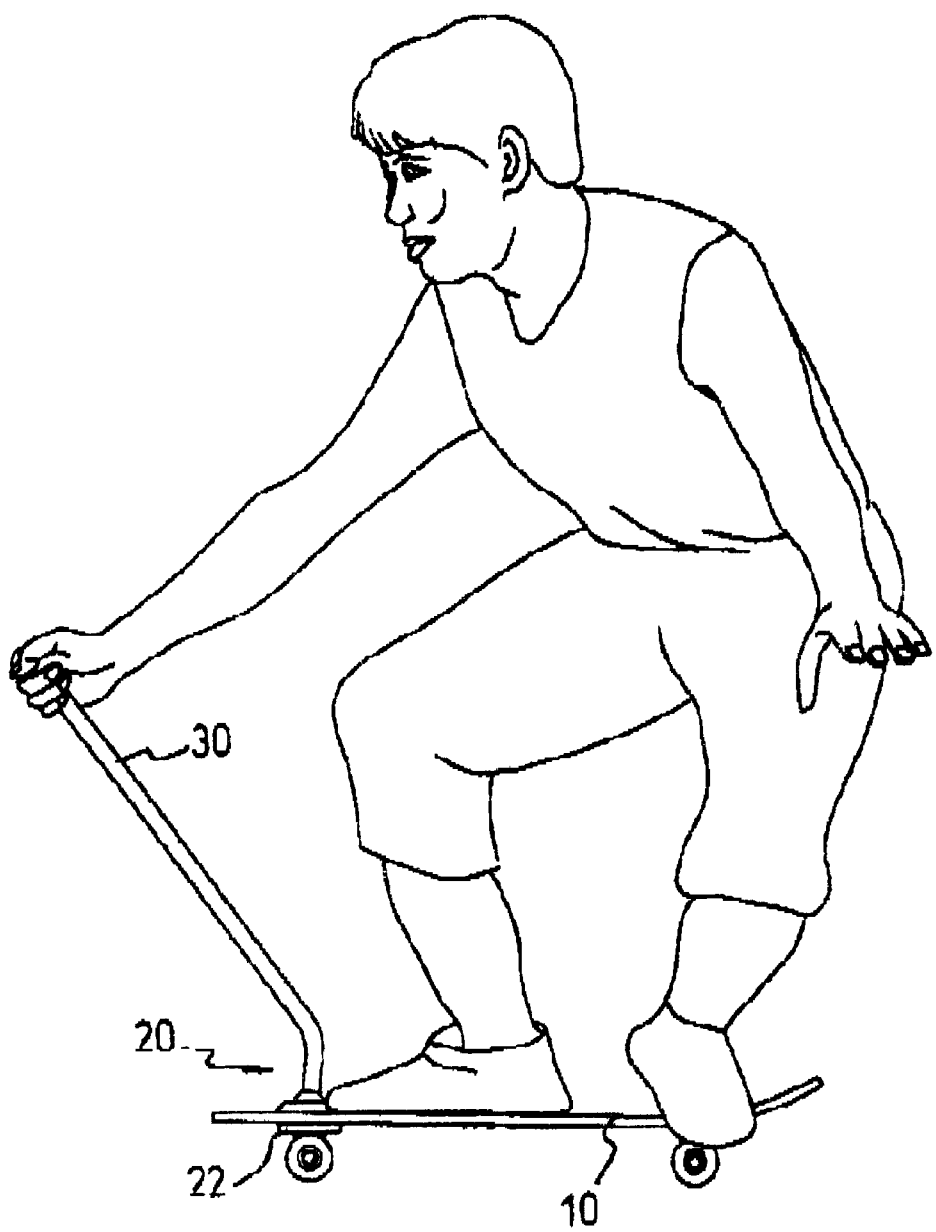
FIG. 6 is a schematic view showing the operation of the steering device when mounted on a skateboard and driven by an adult.

With reference to FIG. 6, when the rider is an adult, the steering shaft (30) extends ahead of the board (10) to maintain a low yet stable position of the rider. The steering shaft (30) can be adjusted to extend more ahead of the board (10) to suit a taller rider. On the other hand, the steering shaft (30) can be adjusted to extend closer to the board (10) to suits a shorter rider. Moreover, the rider can turn the steering shaft (30) left or right to agilely change the traveling direction of the skateboard.

Figure 7:
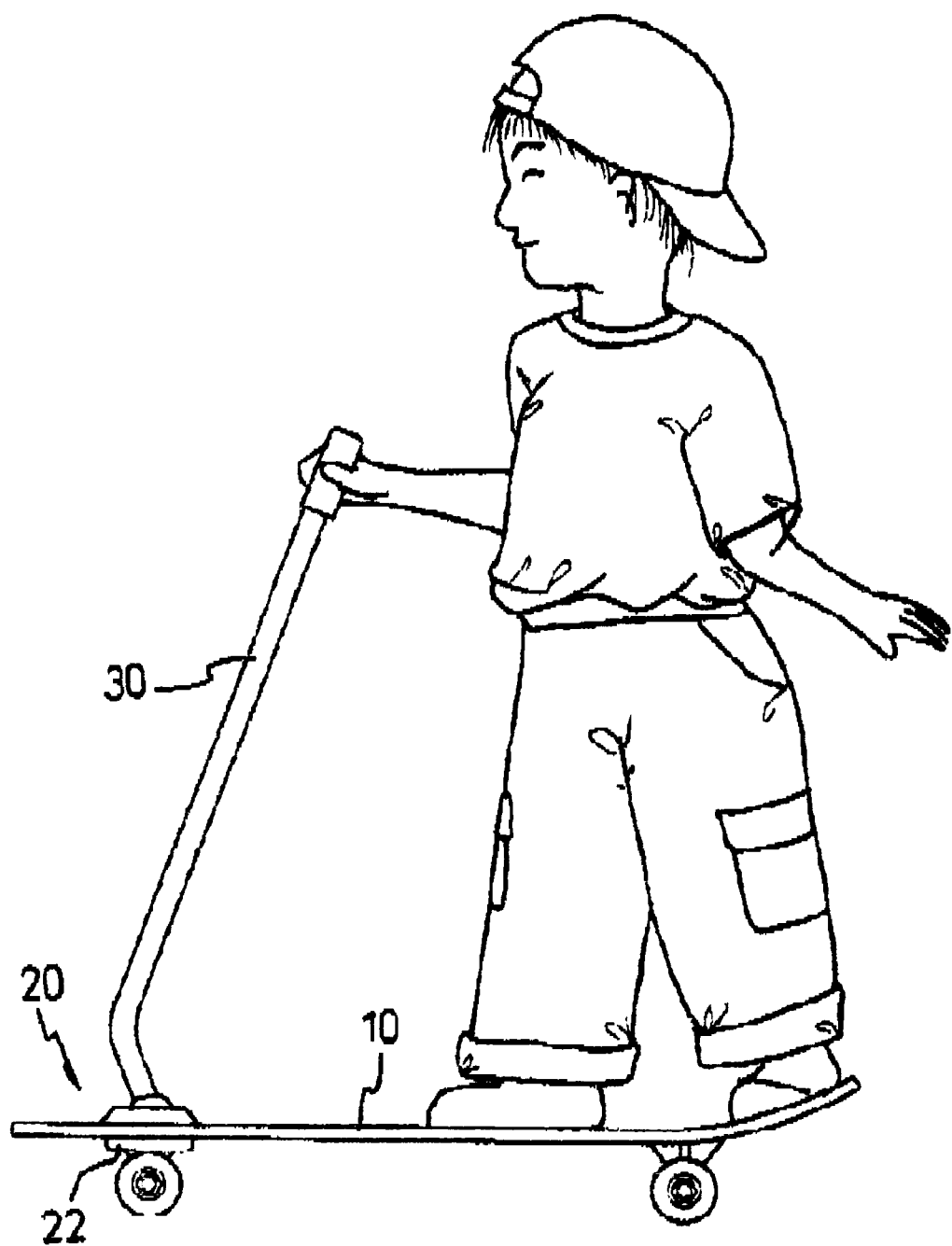
FIG. 7 is a schematic view showing the operation of the steering device when driven by a child.

With reference to FIG. 7, when the rider is a child, the steering device (20) can be turned 180 degrees so that the steering shaft now extends in a position above the board (10). This position is especially suitable for children because children have a considerably small body size if compared with adults. The position of the steering shaft (30) extending above the board (10) makes it easier for the child rider to reach the handle (306).

From the above description, it is noted that the invention has the following advantages:

1. The steering device (20) in accordance with the present invention can be enable the skateboard to be turned agilely.
2. The steering device (20) can be adjusted to suit riders of different body sizes.
3. The steering device (20) can be adjusted to suit adults as well as children.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A steering device for a skateboard, the steering device comprising:

a front seat securely adapted to a front wheel assembly and having a cylinder, the cylinder comprising:

a receiving hole defined therein;

a flange outwardly extending from the cylinder;

a pair of first abutting walls oppositely formed on an inner face defining the receiving hole, each of the first abutting walls having a stud hole communicating with the receiving hole; and a threaded portion formed on an outer surface of the cylinder;

a bearing mounted around the cylinder and resting on the flange;

a sphere snugly received in the receiving hole and having a shaft hole and a pair of second abutting walls each oppositely formed on a periphery of the sphere to abut to a corresponding one of the first abutting walls of the cylinder, each of the second abutting walls having an aperture extending therethrough;

a steering shaft extending into and received in the shaft hole to be securely connected to the sphere;

a stud extending through the aperture in the sphere and threadingly engaging the stud holes defined in the cylinder to restrict the movement of the sphere in the receiving hole of the cylinder;

a retaining ring threadingly mated with the threaded portion of the cylinder and adapted to engage with a top surface of the skateboard so that the bearing and a cap are securely sandwiched between the skateboard and the flange of the cylinder; and a top washer mounted around the cylinder and disposed on top of the bearing, wherein the top washer has a first annular groove, such that balls of the bearing are able to be partially received in the first annular groove, whereby tiltable movement of the steering shaft in a horizontal plane to the skateboard drives the front wheel assembly to turn correspondingly.

2. The steering device as claimed in claim 1 further comprising at bottom washer sandwiched between the bearing and the flange of the cylinder, the bottom washer having a second annular groove, wherein the balls of the bearing are partially received in the second annular groove.

3. The steering device as claimed in claim 1 further comprising at least one retaining piece formed on a bottom surface defining the receiving hole to support the sphere in the receiving hole.

* * * * *